(12) United States Patent  
Searfoss

(10) Patent No.: US 6,527,331 B2
(45) Date of Patent: Mar. 4, 2003

(54) BOW SYSTEM FOR A TRUCK COVER

(76) Inventor: Timothy K. Searfoss, 1282 E. M-55, West Branch, MI (US) 48661

( * ) Notice: Subject to any disclaimer, the term of this patent is extended or adjusted under 35 U.S.C. 154(b) by 0 days.

(21) Appl. No.: 09/752,192

(22) Filed: Dec. 29, 2000

(65) Prior Publication Data
US 2002/0084672 A1 Jul. 4, 2002

(51) Int. Cl.[7] ................................................. B60P 7/04
(52) U.S. Cl. ..................................... 296/100.18; 296/98
(58) Field of Search ............................. 296/98, 100.15, 296/100.18, 100.17, 104

(56) References Cited

U.S. PATENT DOCUMENTS

| 1,491,857 | A | * | 4/1924 | Heintz .................... 296/100.17 |
| 2,594,910 | A | * | 4/1952 | Germann ..................... 296/98 |
| 3,226,153 | A |   | 12/1965 | Haid |
| 4,042,275 | A | * | 8/1977 | Glassmeyer et al. .... 296/104 X |
| 4,212,492 | A |   | 7/1980 | Johnsen |
| 4,248,475 | A | * | 2/1981 | Johnsen ................... 296/100.17 |
| 4,479,677 | A | * | 10/1984 | Gulette et al. ................. 296/98 |
| 4,480,652 | A | * | 11/1984 | Gooch ....................... 296/98 X |
| 4,484,777 | A |   | 11/1984 | Michel |
| 4,660,882 | A |   | 4/1987 | Hensiek |
| 4,792,178 | A |   | 12/1988 | Kokx |
| 4,854,630 | A |   | 8/1989 | Biancale |
| 4,854,633 | A |   | 8/1989 | Kraft et al. |
| 4,902,065 | A |   | 2/1990 | Thralls |
| 4,915,439 | A |   | 4/1990 | Cramaro |
| 4,923,240 | A |   | 5/1990 | Swanson |
| 5,080,423 | A |   | 1/1992 | Merlot et al. |
| 5,102,182 | A |   | 4/1992 | Haddad, Jr. |
| 5,145,230 | A |   | 9/1992 | Biancale |
| 5,211,441 | A |   | 5/1993 | Barkus et al. |
| 5,240,304 | A |   | 8/1993 | Cramaro et al. |
| 5,301,995 | A |   | 4/1994 | Isler |
| 5,460,423 | A |   | 10/1995 | Kersting et al. |
| 5,487,584 | A | * | 1/1996 | Jespersen ................ 296/100.18 |
| D368,888 | S | * | 4/1996 | Stephens et al. ........... D12/223 |
| 5,524,953 | A |   | 6/1996 | Shaer |
| 5,658,037 | A |   | 8/1997 | Evans et al. |
| 5,690,377 | A |   | 11/1997 | Denyer |
| 5,873,210 | A | * | 2/1999 | Brumleve .......... 296/100.17 X |
| 5,924,759 | A |   | 7/1999 | DeMonte et al. |
| 5,938,270 | A |   | 8/1999 | Swanson et al. |
| 5,944,039 | A | * | 8/1999 | Bergeron ........... 296/100.15 X |
| 5,951,092 | A |   | 9/1999 | Cissell |
| 6,053,556 | A |   | 4/2000 | Webb |
| RE36,748 | E |   | 6/2000 | Stephens et al. |
| 6,086,134 | A |   | 7/2000 | Cravens et al. |

* cited by examiner

Primary Examiner—D. Glenn Dayoan
Assistant Examiner—Jason Morrow
(74) Attorney, Agent, or Firm—Cardinal Law Group

(57) ABSTRACT

A bow system is disclosed for an open top of a truck bed. A pair of brackets are fastened to the truck bed proximate a side wall, and have an extension extending generally inwardly and upwardly. A bow having a width greater than its height spans the open top of the truck bed, and is fastened to the extensions.

19 Claims, 4 Drawing Sheets

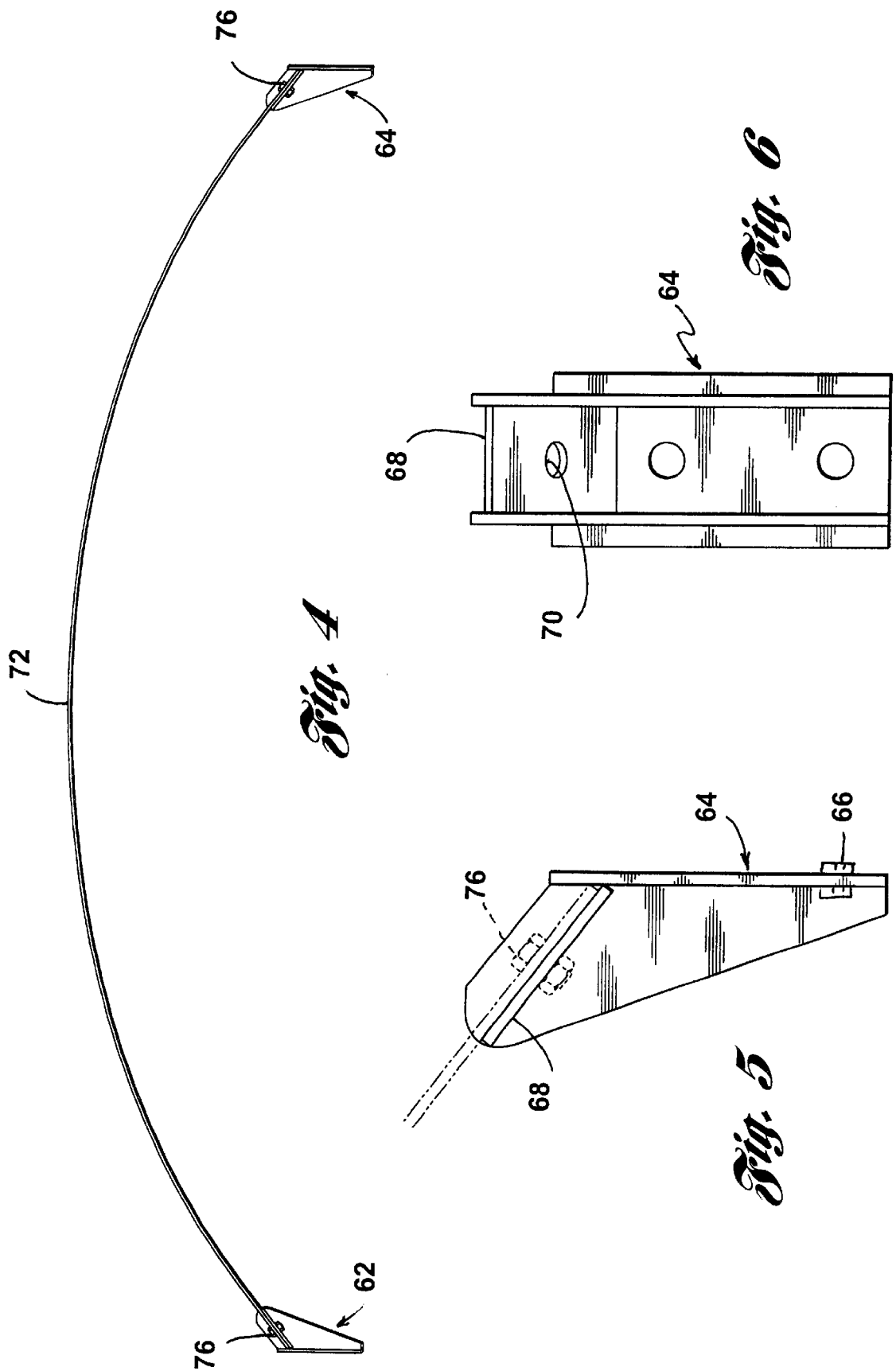

BOW SYSTEM FOR A TRUCK COVER

TECHNICAL FIELD

This invention relates to covers for truck beds, and more particularly to a bow system for a truck cover.

BACKGROUND ART

Many trucks, particularly those hauling loose loads such as sand and gravel, need a truck cover to prevent the wind from blowing load particles off the load bed. Various apparatus have been devised for covering a truck load. Some such apparatus include a motor for selectively winding a flexible cover. My U.S. Pat. No. 5,031,955 provides a truck cover which may be conveniently motor operated from the cab of a truck to extend the cover from a winding assembly proximate the front of the truck bed and forward the rear of the truck bed. My '955 patent is hereby incorporated by reference. A need also exists for systems that cover the truck bed from side to side. For instance, U.S. Pat. No. 5,328,228 shows a cover for truck bed and cargo. Similarly, U.S. Pat. No. 5,924,758 shows a roll assist mechanism for tarp systems.

DISCLOSURE OF INVENTION

The present invention is a bow system for an open top of a truck bed. The apparatus comprises a pair of brackets and a bow. Each bracket is fastened to the truck bed proximate a side wall, and has an extension extending generally inwardly and upwardly. The bow has a width greater than its height, spans the open top of the truck bed, and is fastened to the extensions.

Accordingly, an object of this invention is to provide an apparatus of the type described above which provides support for a side-to-side truck cover.

Another object of this invention is to provide an apparatus of the type described above which is simpler and less expensive than existing truck cover support systems.

These and other objects, features, and advantages of the present invention are readily apparent from the following detailed description of the best mode for carrying out the invention when taken in conjunction with the accompanying drawings.

BRIEF DESCRIPTION OF DRAWINGS

FIG. 4 is a side view of one embodiment of a bow for use in the present invention;

FIG. 5 is a side view of one embodiment of a bracket for use in the present invention; and FIG. 6 is a front view of the bracket.

BEST MODE FOR CARRYING OUT THE INVENTION

Figure 1:
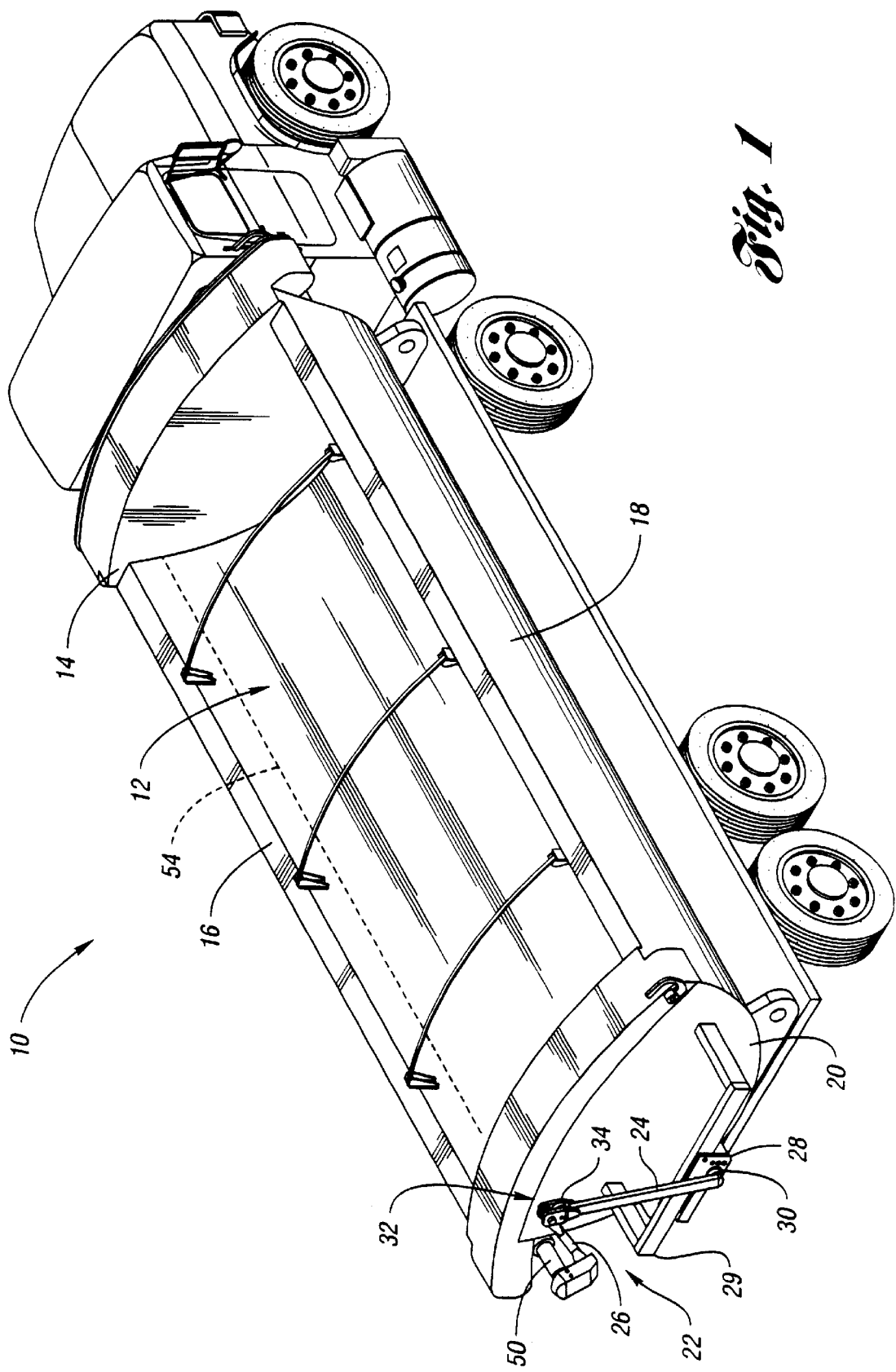
FIG. 1 is a perspective view of a truck including a bow system according to the present invention for covering a bed of the truck.

With reference to the drawings, the preferred embodiments of the present invention will be described. FIG. 1 shows an apparatus 10 according to the present invention for covering a bed 12 of a truck having a front 14, two sides 16 and 18, and a rear 20. The apparatus 10 comprises a main arm 22 including a base 24 and an extension 26.

The base 24 is mounted at a base plate 28 so as to be pivotal across at least a portion of the rear 20 of the truck bed. In some instances, the base plate 28 may be mounted in turn on an adaptor bracket 29. The base plate 28 includes at least one spiral torsion spring 30. Preferably, one end of each of the springs 30 engages a groove formed in the surface of and extending a substantial portion of the length of a center shaft, while the other ends of the springs cooperate with a locator pin. Further details of this arrangement are taught by U.S. Pat. No. 5,887,937, which is hereby incorporated by reference. In this way, the base 24 is normally biased clockwise as shown through an intermediate position shown in FIG. 2 and toward a covered, deployed position shown in FIG. 3.

The extension 26 is pivotally connected to the base 24 by a hinge or knuckle 32. Preferably, a knuckle shaft is welded or otherwise fixed to one of a pair of plates extending from an upper end of the base 24. The knuckle shaft extends through a similar pair of plates extending from the lower end of the extension 26 such that the knuckle shaft is rotatable with respect to the extension. One end of each of a plurality of spiral torsion springs 34 preferably engages an axial groove formed in the knuckle shaft. The other ends of the springs 34 cooperate with a knuckle locator pin. Further details of this arrangement are taught by U.S. Pat. No. 5,944,374, which is hereby incorporated by reference. In this way, the extension 26 is biased clockwise as shown with respect to the free end of the base 24.

A second or bearing arm 40 similarly includes a base 42 pivotal across at least a portion of the front 14 of the truck bed, and an extension 44 pivotally connected by a knuckle 46 to the bearing arm base 42. A reel 50 extends between distal ends of the extensions 26 and 44. The reel 50 is rotatable, and functions as a take-up spool for one end of a flexible tarp or cover 52. The other end of the cover 52 is clamped, riveted, or otherwise fixed at one or more points along a line 54 below the top of the side 16 of the truck. In the fully uncovered position shown in FIG. 1, the cover 52 is wound on the reel 50, which in turn rests near the line 54. With the apparatus 10 in this position, the truck bed may dump in either the clockwise or counterclockwise direction without interference from the retracted cover.

A motor 56 is mounted on the distal end of either the arm 44 or, more preferably as shown, on the distal end of the arm 26. The motor 56 is operatively connected to the reel 50 and can be energized, from within or without the cab of the truck, to rotate the reel 50 and wind up the cover 52. When energized, the motor 56 drives the reel 50 to retract the cover 52 against the tension force of the springs and uncover the load bed. Further details of one embodiment of the motor are taught by U.S. Pat. No. 5,829,819, which is hereby incorporated by reference.

Figure 2:
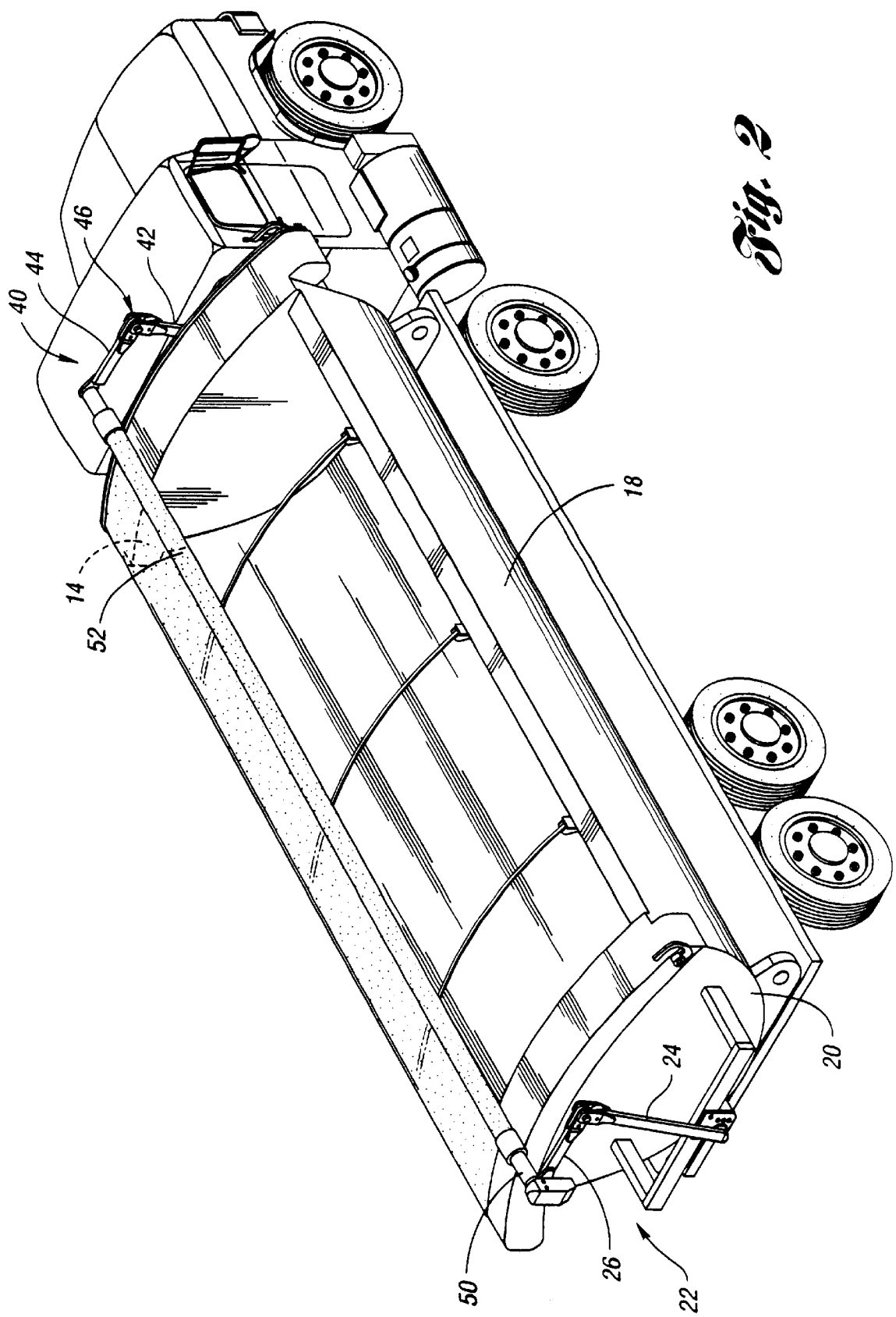
FIG. 2 is a perspective view of the truck showing a cover in a partially deployed position.
Figure 3:
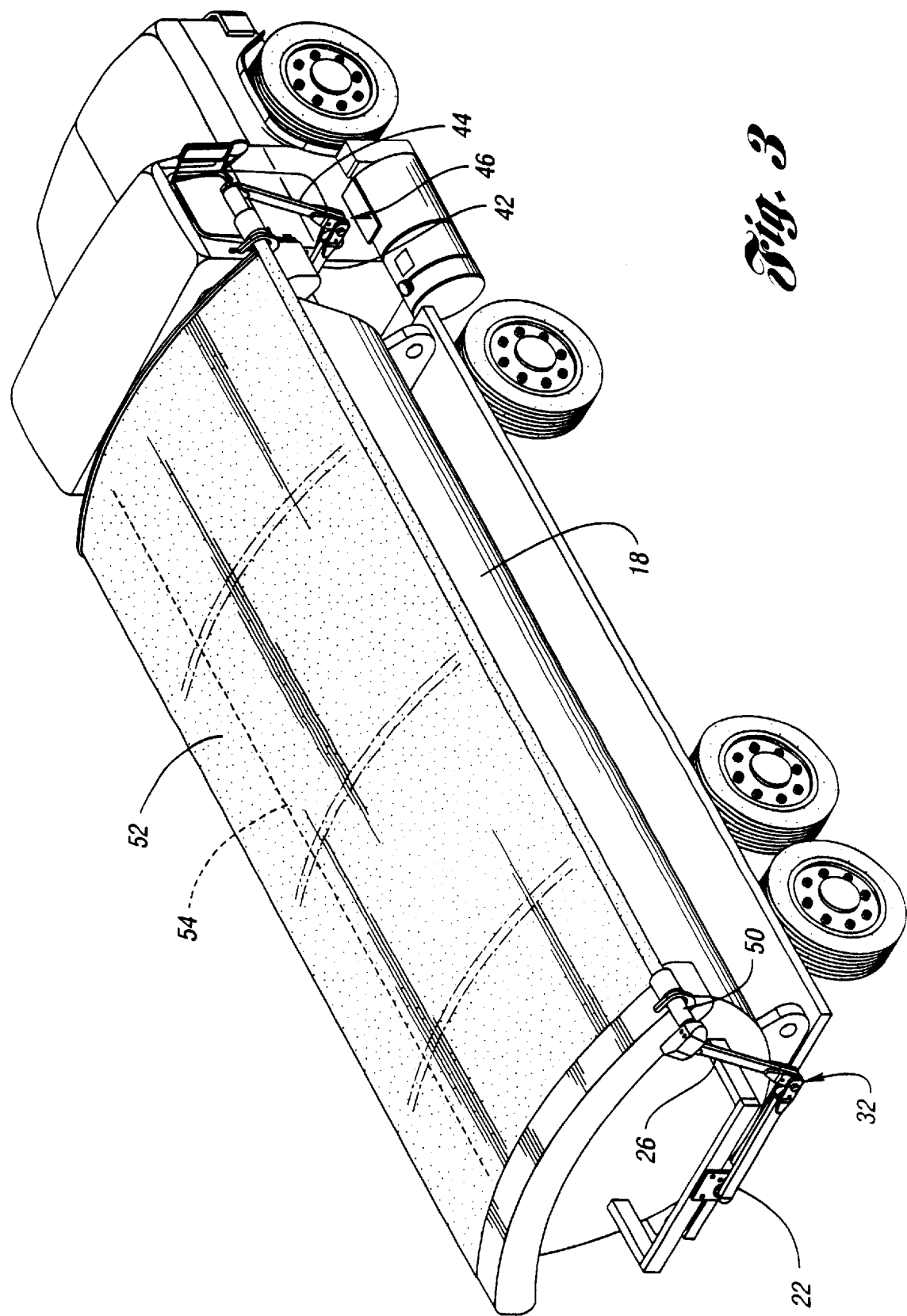
FIG. 3 is a perspective view of the truck showing the cover in a deployed position.

When the motor 56 is energized, and a brake is released, the arms 22 and 40 swing toward the right side 18 of the truck bed as shown in FIGS. 2 and 3. The cover 52 is then pulled off of the reel 50 and extended over the load bed. As the bases 24 and 42 are biased toward the right side 18 of the truck, the knuckle springs also bias the extensions 26 and 44 toward the right side of the truck so as to hold the cover 52 in tension. One or more hooks 58 provide a positive stop to engage the reel 50 and prevent over extension. Alternatively, stops can be provided for the base(s) and/or the extension(s). Rotation of the extensions 26 and 44 relative to their respective bases is normally in the range of about 30 to 40 degrees. In still another alternative embodiment, the arms 22 and 44 are permitted to rotate to a position proximate the right side 18 roughly equivalent to the position 54. In this position, the cover 52 is clamped, i.e. the reel 50 is tucked below the top of the right side 18 of the truck.

By varying the position of the locator pins, the number of springs and/or the spring constant of the springs, the forces biasing the bases and the extensions toward the deployed position are variable. In a preferred embodiment, six springs are used in base of main arm 22, three springs in the main knuckle 32, five springs in the bearing base, and two springs in the bearing knuckle 46. In this arrangement the knuckles 32 and 46 open more quickly than the bases 24 and 42 rotate, thus accommodating the weight of the motor 56 and allowing the motor to swing from its place proximate the position 54 and clear the top edge of the side 16 of the truck.

The truck is also preferably provided with a bow system. As best shown in FIGS. 4 through 6, opposite brackets 62 and 64 are situated on the truck bed proximate the side walls 16 and 18. The brackets 62 and 64 are preferably fastened to the truck bed by welds, rivets, or removable bolts 66. The brackets each have an extension 68 which extends generally inwardly and upwardly. An opening 70 is also provided in each extension 68.

A series of flexible, resilient bows 72 span the open top of the truck bed. Each bow has a width greater than its height, and may preferably be a single piece of aluminum or steel in the form of a leaf spring. An opening is formed at the opposite ends of each bow. Fasteners, such as relatively permanent rivets or removable bolts 76, extend through one of the openings in the bow end and one of the openings 70 in a respective bracket to secure the bows to the brackets.

The bows 72 each form an arch over the truck bed. In this way, they provide support for the cover 52 intermediate the front 14 and the rear 20. Because the bows are flexible and resilient, they can accept contact such as might be initiated by construction equipment. Depending upon the severity of the contacts, the bows return to something at or near their original form.

It should be understood that while the forms of the invention shown and described above constitute preferred embodiments of the invention, they are not intended to illustrate all possible forms thereof. For example, the invention may be utilized on both flat truck beds and those having raised sides as illustrated. It should also be understood that the words used are words of description rather than limitation, and various changes may be made without departing from the spirit and scope of the invention disclosed.

What is claimed is:

1. A bow system for an open top of a truck bed, the truck bed having opposite side walls, the apparatus comprising:

a pair of brackets, each bracket being fastened to the truck bed proximate one of the side walls and having an extension extending generally inwardly and upwardly; and a bow having a width greater than its height, the bow comprising a leaf spring and spanning the open top of the truck bed and being fastened to the extensions.

2. The system of claim 1 wherein the bow forms an arch over the truck bed.

3. The system of claim 1 wherein the bow is fastened to the extensions by a bolt.

4. The system of claim 3 wherein the bolt is removable.

5. The system of claim 1 wherein each bracket is fastened to its respective side wall by a bolt.

6. The system of claim 5 wherein the bolt is removable.

7. The system of claim 1 further comprising a cover adapted to lay atop the bow and cover the open top of the truck bed.

8. The system of claim 1 further comprising a second bow spanning the open top of the truck bed and being fastened to a second pair of brackets.

9. The system of claim 8 wherein the second bow has a width greater than its height.

10. A bow system for an open top of a truck bed, the truck bed having opposite side walls, the apparatus comprising:

a pair of brackets, each bracket being fastened to the truck bed proximate one of the side walls and having an extension extending generally inwardly and upwardly, the extension having an opening;

a bow spanning the open top of the truck bed and having a width greater than its height, the bow having opposite ends each having an opening; and a pair of fasteners, each fastener extending through one of the openings in the bow end and one of the openings in a respective bracket;

the bow comprising a leaf spring.

11. The system of claim 10 wherein the bow forms an arch over the truck bed.

12. The system of claim 10 wherein the fasteners comprise bolts.

13. The system of claim 12 wherein the bolts are removable.

14. The system of claim 10 wherein each bracket is fastened to its respective side wall by a bolt.

15. The system of claim 14 wherein the bolt is removable.

16. The system of claim 10 further comprising a cover adapted to lay atop the bow and cover the open top of the truck bed.

17. The system of claim 10 further comprising a second bow spanning the open top of the truck bed and being fastened to a second pair of brackets.

18. The system of claim 17 wherein the second bow has a width greater than its height.

19. A bow system for an open top of a truck bed, the truck bed having opposite side walls, the apparatus comprising:

a plurality of brackets, each bracket being fastened to the truck bed proximate one of the side walls and having an extension extending generally inwardly and upwardly, each extension having an opening;

a plurality of leaf springs forming arches over the open top of the truck bed, each leaf spring having a width greater than its height, and each leaf spring having opposite ends each having an opening;

a plurality of fasteners, each fastener extending through one of the openings in the leaf spring end and one of the openings in a respective extension; and a cover adapted to lay atop the leaf springs and cover the open top of the truck bed.

\* \* \* \* \*